(12) United States Patent
Drouin et al.

(10) Patent No.: US 6,894,453 B2
(45) Date of Patent: May 17, 2005

(54) METHOD AND APPARATUS TO MEASURE DISK DRIVE HEAD LOAD/UNLOAD VELOCITY

(75) Inventors: David M. Drouin, Milpitas, CA (US); Avraham Perahia, San Jose, CA (US)

(73) Assignee: Riospring, Inc., Milpitas, CA (US)

( * ) Notice: Subject to any disclaimer, the term of this patent is extended or adjusted under 35 U.S.C. 154(b) by 0 days.

(21) Appl. No.: 10/687,056

(22) Filed: Oct. 16, 2003

(65) Prior Publication Data

US 2004/0080857 A1 Apr. 29, 2004

Related U.S. Application Data

(60) Provisional application No. 60/420,631, filed on Oct. 22, 2002.

(51) Int. Cl.[7] ............................................. G11B 21/02
(52) U.S. Cl. ........................ 318/569; 318/601; 360/75
(58) Field of Search .................. 318/459, 500, 318/569, 592, 594, 600, 601, 619; 360/73.01, 75

(56) References Cited

U.S. PATENT DOCUMENTS

| | | | |
|---|---|---|---|
| 4,879,612 A | * | 11/1989 | Freeze et al. ............ 360/78.06 |
| 5,384,524 A | * | 1/1995 | Romano ..................... 318/569 |
| 5,615,064 A | * | 3/1997 | Blank et al. .................. 360/75 |
| 6,118,616 A | * | 9/2000 | Jeong ...................... 360/78.07 |
| 6,507,451 B1 | * | 1/2003 | Sugimoto ................ 360/78.07 |
| 6,566,838 B2 | * | 5/2003 | Maiocchi ..................... 318/652 |

* cited by examiner

Primary Examiner—Bentsu Ro
(74) Attorney, Agent, or Firm—Michael B. Einschlag

(57) ABSTRACT

One embodiment of the present invention is an apparatus to provide a measure of disk drive head velocity in a disk drive wherein movement is produced by a disk drive motion mechanism that includes a coil, which apparatus includes: (a) a controller that outputs one or more digital signals that are applied as input to a first component, and in response, the first component outputs a reference voltage; (b) a second component, responsive to voltage output across the coil and the reference voltage, outputs a measure of a difference between the coil voltage and the reference voltage; and (c) a third component, responsive to the measure of the difference, outputs a first value if the coil voltage is greater than the reference voltage and a second value if the coil voltage is less than the reference voltage, which third component output is applied as input to the controller; wherein the controller executes a search algorithm that varies the one or more digital signals while observing changes in the third component output to provide a digital estimate of the coil voltage, which estimate provides a measure of the disk drive head velocity.

8 Claims, 5 Drawing Sheets

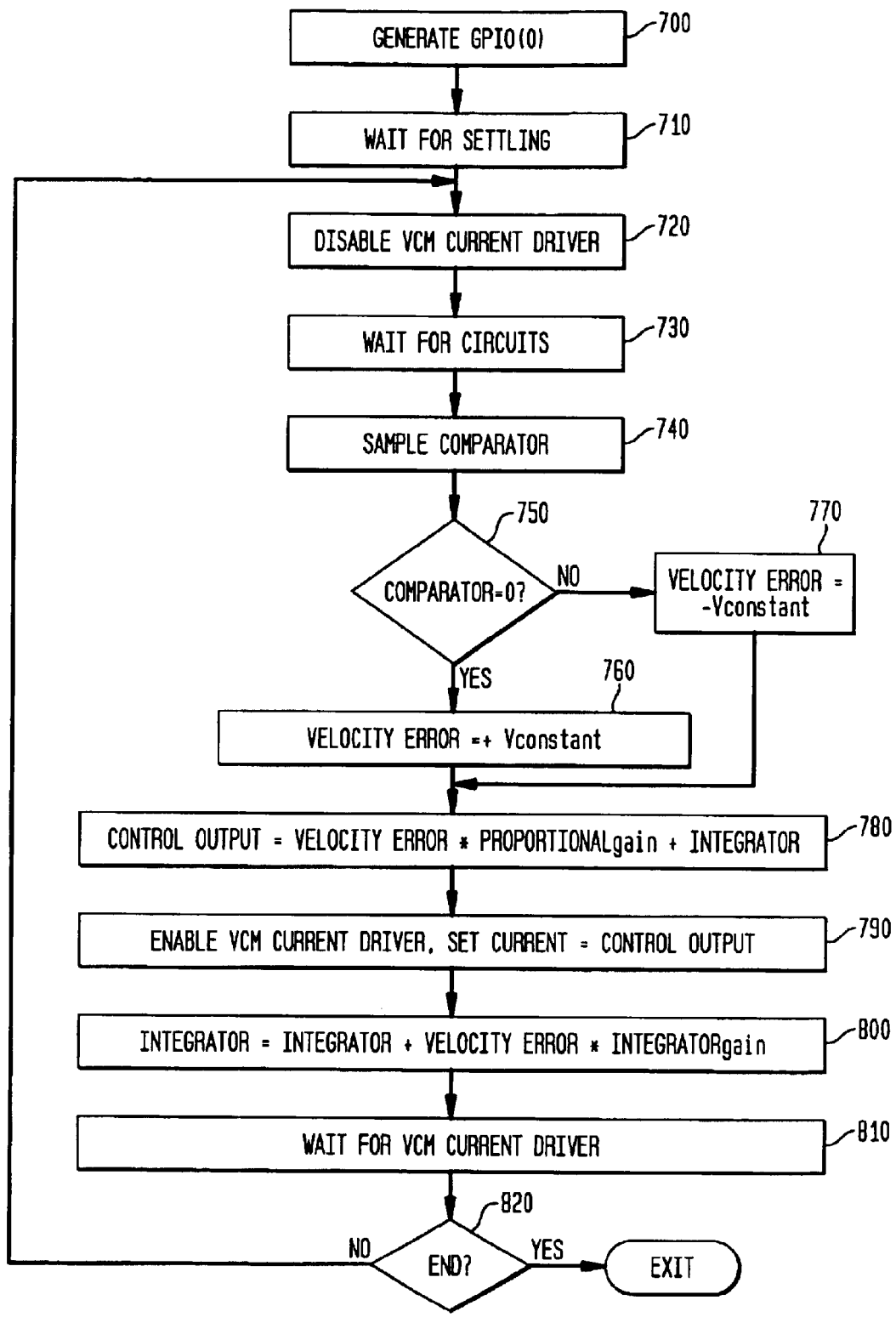

US 6,894,453 B2

METHOD AND APPARATUS TO MEASURE DISK DRIVE HEAD LOAD/UNLOAD VELOCITY

This application claims the benefit of U.S. Provisional Application No. 60/420,631, filed on Oct. 22, 2002, which is incorporated herein by reference.

TECHNICAL FIELD OF THE INVENTION

One or more embodiments of the present invention relate generally to method and apparatus to measure disk drive head load/unload velocity.

BACKGROUND OF THE INVENTION

As is well known in the art, most small form factor disk drives utilize a ramp load/unload process wherein disk drive heads are loaded onto a disk (i.e., placed in position to read/write data from/to the disk) by causing an arm holding the heads to rotate so that it moves down along a ramp. Further, as is also well known in the art, when data access from/to the disk is complete, the disk drive heads may be unloaded from the disk by causing the arm to rotate so that it moves up along the ramp.

In order to ensure long-term disk drive reliability, the above-described ramp load/unload process should be controlled so that no damage to the disk and disk drive heads occurs. Generally, this involves using a servo control system that attempts to maintain the load and unload velocity of the disk drive heads on an optimized trajectory. As is known, this entails, among other things, measuring disk drive head velocity during the load/unload process.

As is well known, movement of disk drive heads is caused by applying current to a voice coil magnet ("VCM") which causes an arm holding the disk drive heads to rotate. Prior art methods to measure the resulting disk drive head velocity typically entail using an analog-to-digital converter to measure a back-EMF voltage generated in the VCM. As is well known, the VCM back-EMF is proportional to an angular velocity of the VCM, and hence, provides a measure of disk drive head velocity. Such prior art methods are problematic because they require circuitry that: (a) is frequently complex, and (b) requires additional space on printed circuit boards. As a result, such prior art methods result in increased disk drive cost.

In light of the above, there is a need to overcome one or more of the above-identified problems.

SUMMARY OF THE INVENTION

One or more embodiments of the present invention satisfy one or more of the above-identified needs in the art. In particular, one embodiment of the present invention is an apparatus to provide a measure of disk drive head velocity in a disk drive wherein movement is produced by a disk drive motion mechanism that includes a coil, which apparatus comprises: (a) a controller that outputs one or more digital signals that are applied as input to a first component, and in response, the first component outputs a reference voltage; (b) a second component, responsive to voltage output across the coil and the reference voltage, outputs a measure of a difference between the coil voltage and the reference voltage; and (c) a third component, responsive to the measure of the difference, outputs a first value if the coil voltage is greater than the reference voltage and a second value if the coil voltage is less than the reference voltage, which third component output is applied as input to the controller; wherein the controller executes a search algorithm that varies the one or more digital signals while observing changes in the third component output to provide a digital estimate of the coil voltage, which estimate provides a measure of the disk drive head velocity.

BRIEF DESCRIPTION OF THE DRAWING

FIG. 5 shows a flowchart of an algorithm that is fabricated in accordance with one or more embodiments of the present invention, which algorithm causes disk drive head velocity to approximate a predetermined value of disk drive head velocity, i.e., a target velocity.

DETAILED DESCRIPTION

One or more embodiments of the present invention measure disk drive head velocity when it is: (a) loaded onto a disk from a ramp; or (b) unloaded from the disk onto the ramp. As is known, the disk drive heads are affixed to an arm, and the arm is driven by a disk drive motion mechanism, which disk drive motion mechanism includes a coil that is often referred to as a so-called a voice coil magnet ("VCM"). In accordance with such a configuration, the disk drive heads rotate at a fixed distance from a pivot point. As is further known, to instigate movement of the disk drive heads, a current pulse is applied to the VCM, which current pulse causes the arm to start to move. After the current pulse has decayed, the arm continues to move (due to inertia), and due to this movement, a back-EMF is generated in the VCM. As is further well known, the VCM back-EMF is proportional to an angular velocity of the VCM, and consequently, the linear velocity of the disk drive heads. Thus, the VCM back-EMF provides a measure of velocity of the disk drive heads.

Figure 1:
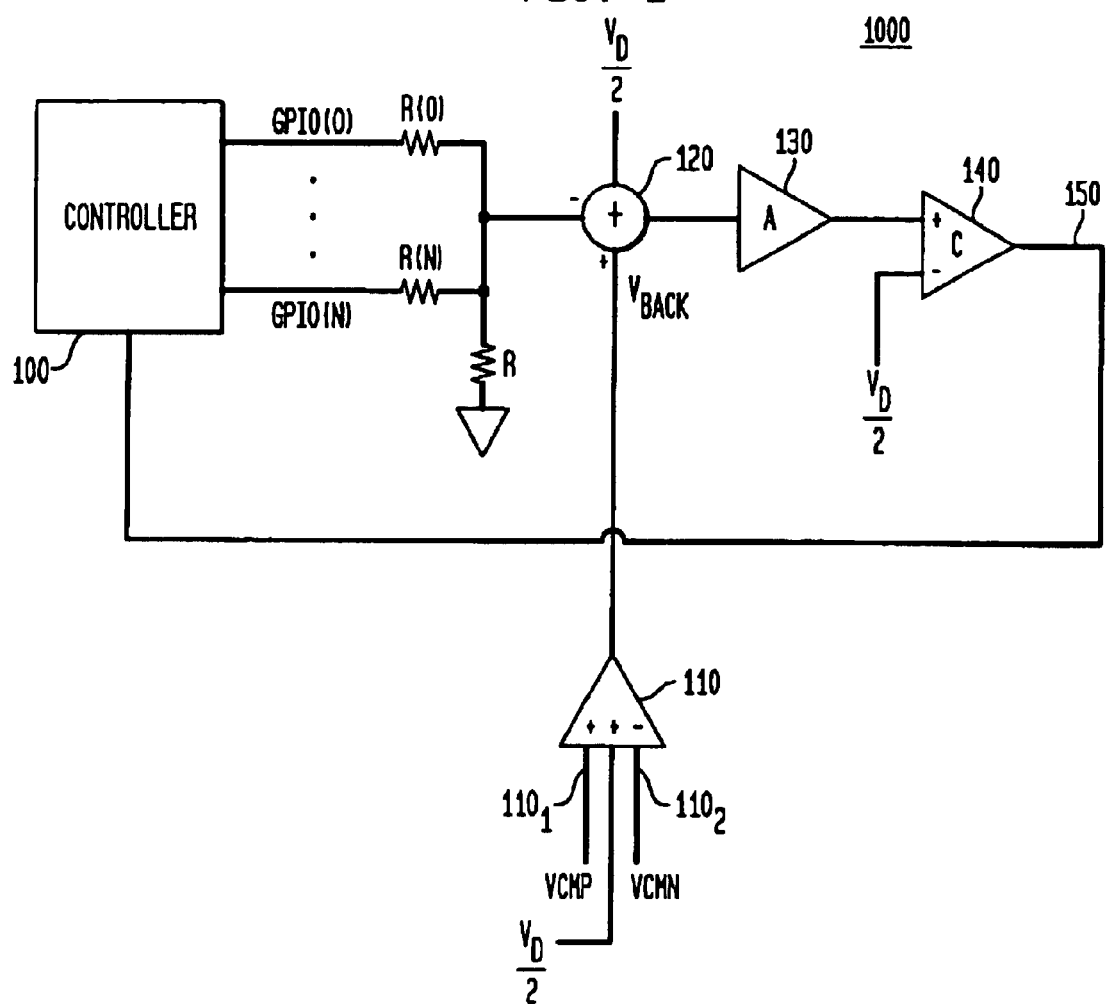
FIG. 1 shows a block diagram of an apparatus that provides a measure of disk drive head velocity, which apparatus is fabricated in accordance with one or more embodiments of the present invention.

FIG. 1 shows a block diagram of apparatus 1000 that provides a measure of disk drive head velocity, which apparatus 1000 is fabricated in accordance with one or more embodiments of the present invention. Assume that apparatus 1000 utilizes a measurement bandwidth of $V_D$, and that $V_D/2$ is the middle of that bandwidth. As shown in FIG. 1, controller 100 generates N+1 digital signals or outputs GPIO(0) to GPIO(N), and digital signals or outputs GPIO(0) to GPIO(N) are applied as input to resistors R(0) to R(N). In accordance with one or more embodiments of the present invention, controller 100 may be a microcontroller utilized in a disk drive, and more specifically, controller 100 may be a digital signal processor ("DSP"). In accordance with one or more such embodiments of the present invention, digital signals or outputs GPIO(0) to GPIO(N) may be provided using, for example and without limitation, general purpose I/O outputs of a DSP. Further, assume that GPIO(0) to GPIO(N) and R(0) to R(N) are chosen so that the voltage range output from resistors R(0) to R(N) (i.e., the range is provided by varying the values of GPIO(0) to GPIO(N)) varies from 0 to $V_D$ and has a midpoint is equal to $V_D/2$.

As further shown in FIG. 1, a back-EMF generated in the VCM (after a driving current to cause motion of the disk drive head has decayed) is applied as input to circuit component 110 at inputs 110$_1$ (positive input) and 110$_2$ (negative input), where circuit component 110 has an amplification of unity and outputs a signal $V_{back}=V_D/2+$VCM back-EMF. Circuit component 110 may be fabricated utilizing readily available commercial components and utilizing any one of a number of methods that are well known to those of ordinary skill in the art.

As further shown in FIG. 1, an output from resistors R(0) to R(N) (i.e., $V_{ref}$) is subtracted from the output from circuit component 110 (i.e., $V_{back})+V_D/2$ at point 120, and the difference is applied as input to amplifier 130 (i.e., the input to amplifier 130=$V_{back}-V_{ref}+V_D/2$. As one of ordinary skill in the art can readily appreciate, amplifier 130 is used to condition signals and provide suitable voltage levels. Next, the amplified difference output from amplifier 130 is applied as input to a positive terminal of comparator 140 and $V_D/2$ is applied as input to a negative terminal of comparator 140. Next, output 150 from comparator 140 is applied as input to controller 100. As one can readily appreciate, output 150 is 0 if $V_{back}-V_{ref}+V_D/2<V_D/2$, and output 150 is, for example and without limitation, 1, if $V_{back}-V_{ref}+V_D/2>V_D/2$. Amplifier 130 and comparator 140 may be fabricated utilizing readily available commercial components and utilizing any one of a number of methods that are well known to those of ordinary skill in the art.

In accordance with one or more embodiments of the present invention, resistors R(0) to R(N) have values of resistance such that the resistance of resistor R(i)=$2^{i}*R$. As a result, by applying digital inputs having a predetermined voltage level (0 or V) as input to resistors R(0) to R(N), the voltage output from resistors R(0) to R(N) may have $2^{N+1}$ different values. As will be described in detail below, and in accordance with one or more embodiments of the present invention, apparatus 1000 provides a measure of velocity of the disk drive heads having a resolution of $2^{N+1}$.

Figure 2:
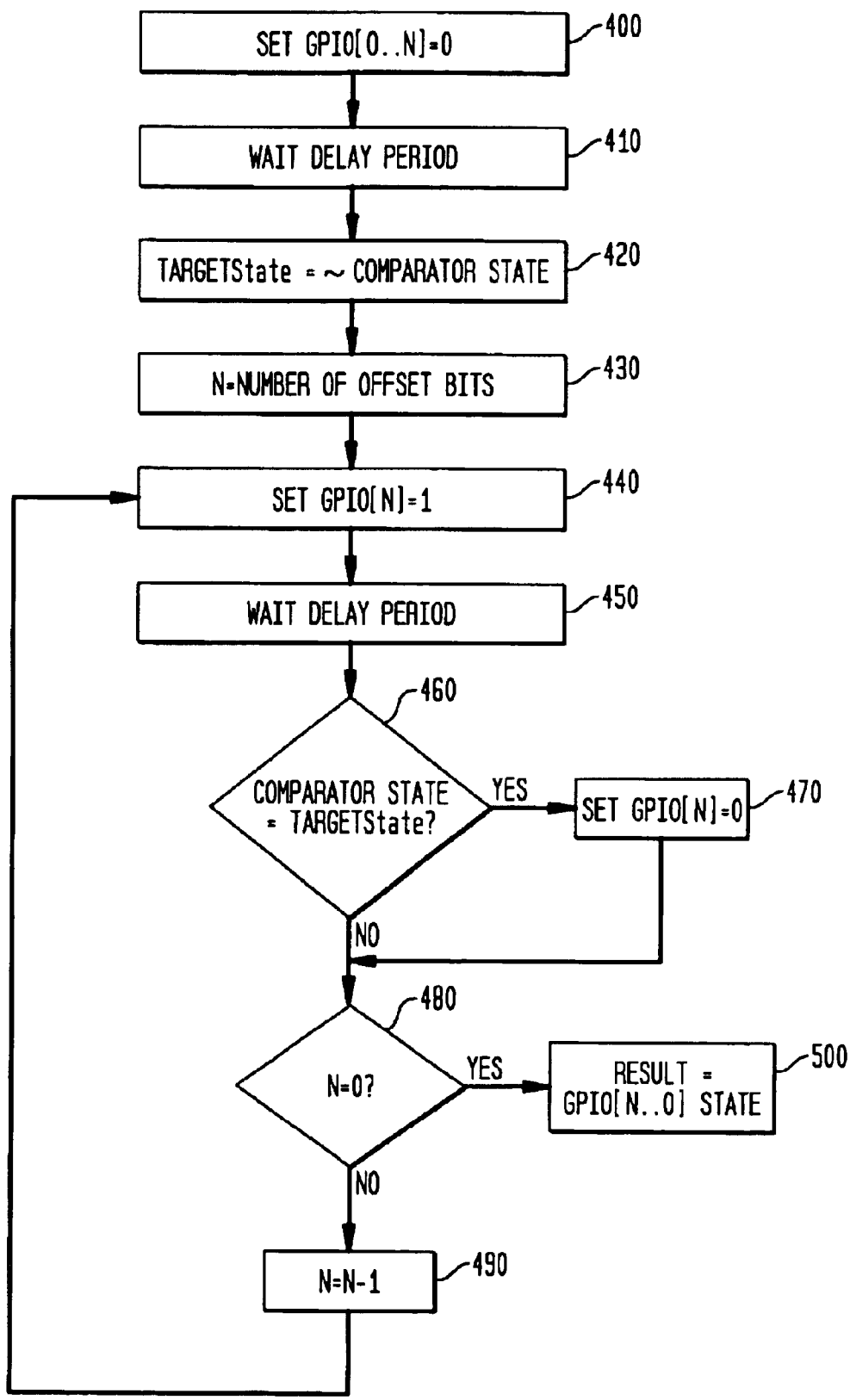
FIG. 2 shows a flowchart of an algorithm that is fabricated in accordance with one or more embodiments of the present invention, which algorithm is executed by a controller of the apparatus shown in FIG. 1 and which algorithm is used to provide a measure of disk drive head velocity.

FIG. 2 shows a flowchart of an algorithm that is fabricated in accordance with one or more embodiments of the present invention, which algorithm is executed by controller 100 of apparatus 1000, and which algorithm is used to provide a measure of disk drive head velocity. In accordance with one or more embodiments of the present invention, the algorithm is a binary search algorithm.

As shown in FIG. 2, at box 400, controller 100 sets each of digital outputs GPIO(0) to GPIO(N) to 0. Control is then transferred to box 410.

At box 410, controller 100 waits for apparatus 1000 to settle after applying outputs GPIO(0) to GPIO(N). Control is then transferred to box 420.

At box 420, controller 100 sets digital state variable TargetState equal to the logical opposite of the digital state value Comparator State where Comparator State corresponds to output 150 from comparator 140 shown in FIG. 1.

In accordance with one or more embodiments of the present invention, (a) Comparator State has a first digital state value (for example and without limitation, 0) if VCM back-EMF<$V_{ref}$ when each of digital outputs GPIO(0) to GPIO(N)=0; and (b) Comparator State has a second digital value (for example and without limitation, 1) if VCM back-EMF>$V_{ref}$ when each of digital outputs GPIO(0) to GPIO(N)=0. The algorithm then performs a binary search to determine VCM back-EMF. Control is then transferred to 430.

At box 430, controller 100 sets N equal to the number of offset bits used in the measurement. In accordance with one or more such embodiments of the present invention, this determines the resolution of the velocity measurement. Control is then transferred to a loop that starts the binary search at box 440.

At box 440, controller 100 sets GPIO(N) equal to a voltage corresponding to logical 1, i.e., the $N^{th}$ general purpose output digital signal is set to logical 1 while the remaining digital outputs retain their previous values. Note that the binary search starts at the most significant bit and works its way down to the least significant bit. Control is then transferred to box 450.

At box 450, controller 100 waits for apparatus 1000 to settle. Control is then transferred to decision box 460.

At decision box 460, controller 100 determines whether the Comparator State (i.e., output state 150) is equal to the TargetState. In essence, this determines whether $V_{ref}$ is large enough so the difference between VCM back-EMF signal and $V_{ref}$ has changed sign. If so, control is transferred to box 470, otherwise, control is transferred to decision box 480.

At box 470, controller 100 sets GPIO(N) equal to 0. In essence, $V_{ref}$ is too large, reduce $V_{ref}$ to its value prior to being increased at box 440. Control is then transferred to decision box 480.

At decision box 480, controller 100 determines whether N equals 0. If so, control is transferred to box 500, otherwise, control is transferred to box 490.

At box 490, controller 100 sets N=N−1. Control is then transferred to box 440 to continue the search.

At box 500, controller 100 converts the following: (the range of values provided by GPIO(0) to GPIO(N), i.e. $2^{N+1}$)/2−the value represented by GPIO(0) to GPIO(N)) to a voltage, and converts this voltage to velocity by multiplying it by a proportionality constant, which proportionality constant may be determined by one of ordinary skilled in the art routinely without undue experimentation based on the characteristics of particular drive mechanics such as, for example and without limitation, strength of the magnet, number of turns in the coil, and so forth.

One or more alternative embodiments of the present invention are fabricated by replacing summing resistors R(0) to R(N) of apparatus 1000 shown in FIG. 1 with a single resistor and an N-bit DAC (digital-to-analog converter). In accordance with one or more of such alternative embodiments: (a) N digital outputs from controller 100 are applied as input to the N-bit DAC; (b) an output voltage from the N-bit DAC is applied as input to the resistor, and (c) an output voltage from the resistor ($V_{ref}$) is applied as input to point 120 of apparatus 1000 shown in FIG. 1.

Figure 3:
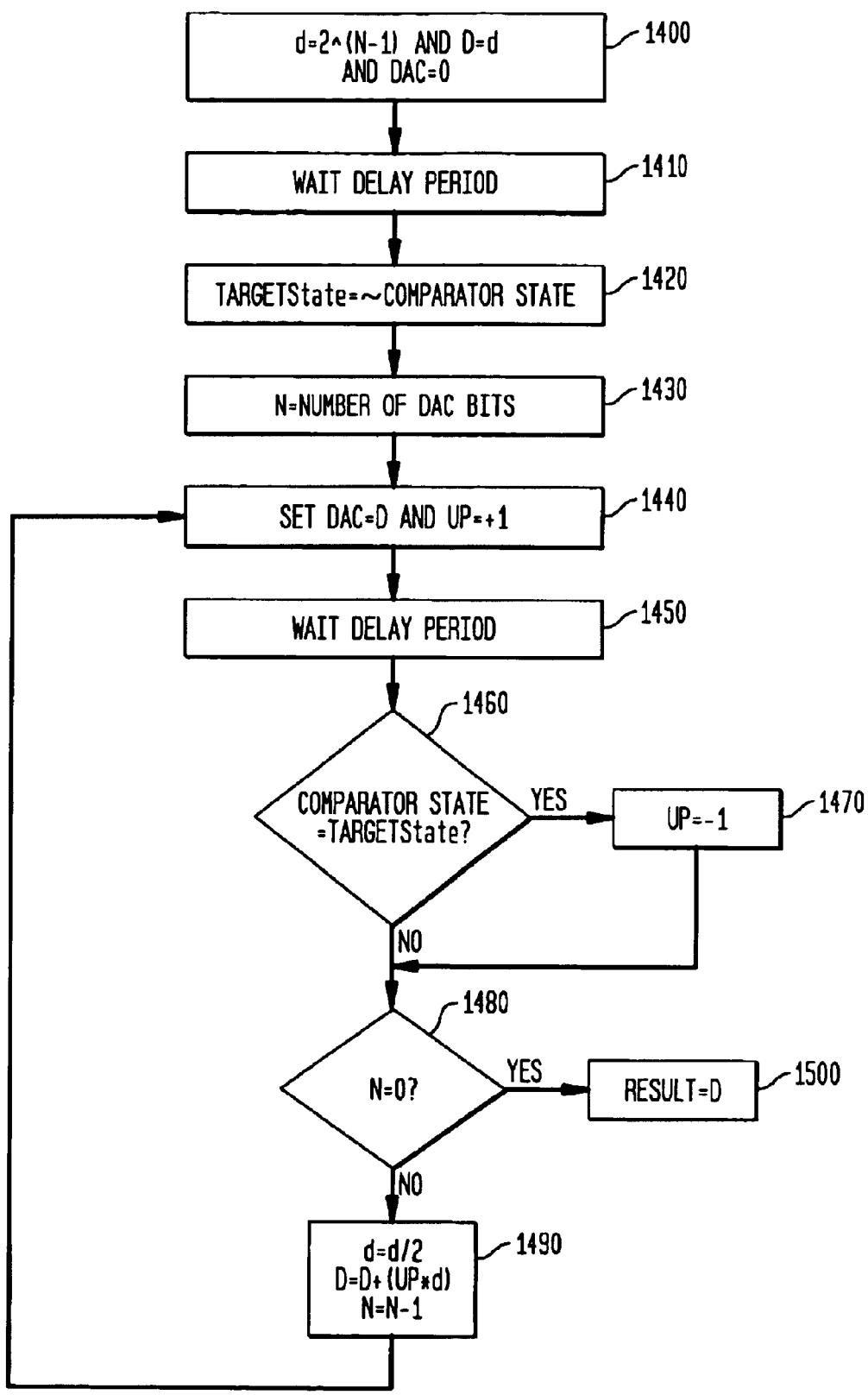
FIG. 3 shows a flowchart of an algorithm that is fabricated in accordance with one or more alternative embodiments of the present invention, which algorithm is executed by a controller in accordance with one or more alternative embodiments of the present invention that utilize an N-bit digital-to-analog converter ("DAC") and which algorithm is used to provide a measure of disk drive head velocity.

FIG. 3 shows a flowchart of an algorithm that is fabricated in accordance with one or more embodiments of the present invention, which algorithm is executed by a controller in accordance with one or more alternative embodiments of the present invention that utilizes an N-bit DAC and which algorithm is used to provide a measure of disk drive head velocity. In essence, the algorithm is a binary search.

As shown in FIG. 3, at box 1400, controller 100 sets d equal to $2^{(N-1)}$, D=d, and DAC=0, where: (a) D is an output from the algorithm; (b) DAC is an output voltage from the N-bit DAC; and (c) d represents the N-bit digital input to N-bit DAC. Control is then transferred to box 1410.

At box 1410, controller 100 waits for apparatus 1000 to settle after applying an input to the N-bit DAC. Control is then transferred to box 1420.

At box 1420, controller 100 sets digital state variable TargetState equal to the logical opposite of the digital state value Comparator State where Comparator State corresponds to output 150 from comparator 140 shown in FIG. 1. Like, the previous algorithm, this algorithm searches for values of N-bit DAC that cause Comparator State to change from its initial value when DAC was set to 0. Control is then transferred to 1430.

At box 1430, controller 100 sets N equal to the number of DAC bits. In accordance with one or more such embodiments of the present invention, this determines the resolution of the velocity measurement. Control is the transferred to a loop that starts at box 1440.

At box 1440, controller 100 sets DAC=D and UP=+1. Control is then transferred to box 1450.

At box 1450, controller 100 waits for apparatus 1000 to settle. Control is then transferred to decision box 1460.

At decision box 1460, controller 100 determines whether the Comparator State (i.e., digital output state 150) is equal to the TargetState. In essence, this determines whether a large enough amount has been subtracted from the VCM back-EMF signal so that the difference between it and $V_{ref}$ has changed sign. If so, control is transferred to box 1470, otherwise, control is transferred to decision box 1480.

At box 1470, controller 100 sets UP equal to −1. In essence, too much has been subtracted from the VCM back-EMF signal, go back to reset the amount to be subtracted, and go back to subtract a little less. Control is then transferred to decision box 1480.

At decision box 1480, controller 100 determines whether N equals 0. If so, control is transferred to box 1500, otherwise, control is transferred to box 1490.

At box 1490, controller 100 sets N=N−1, d=d/2, D=D+ (UP*d). Control is then transferred to box 1440.

At box 1500, controller 100 converts the following: (the range of values provided by the DAC)/2–the value represented by D) to a voltage, and converts this voltage to velocity by multiplying it by a proportionality constant, which proportionality constant may be determined by one of ordinary skilled in the art routinely without undue experimentation based on the characteristics of particular drive mechanics such as, for example and without limitation, strength of the magnet, number of turns in the coil, and so forth.

Figure 4:
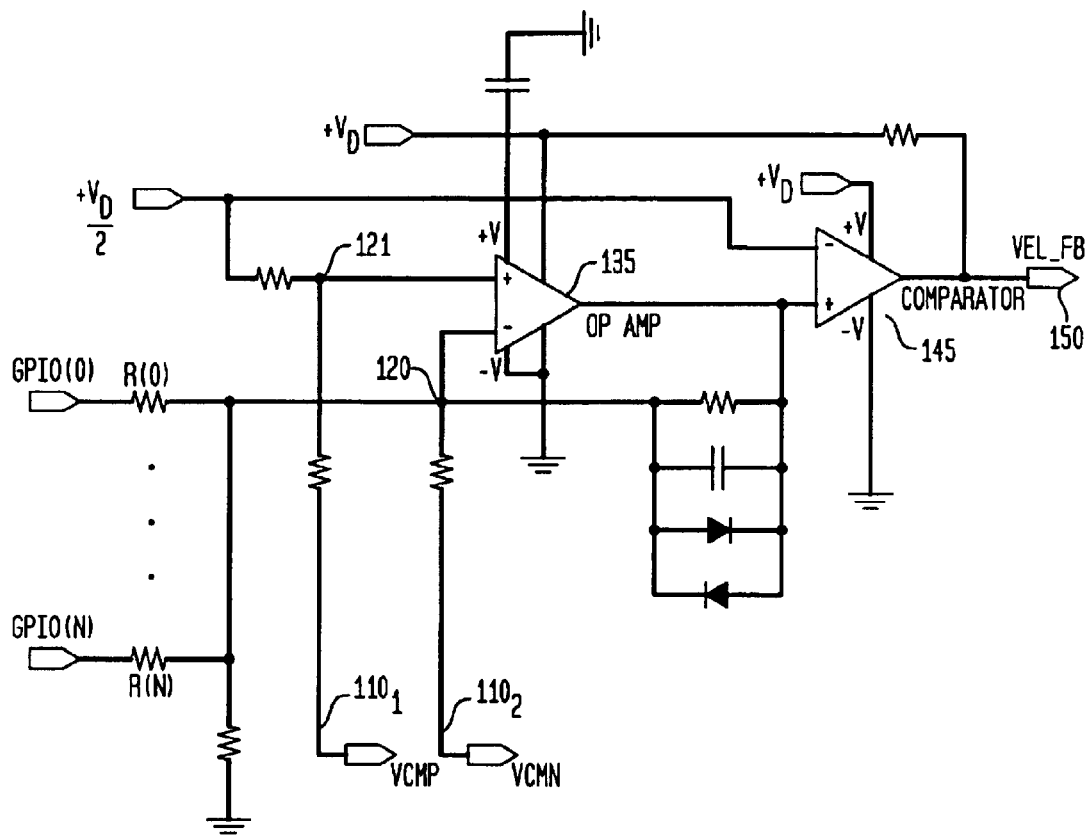
FIG. 4 shows a circuit diagram used to fabricate one or more embodiments of the apparatus shown in FIG. 1.

FIG. 4 shows a circuit diagram used to fabricate one or more embodiments of apparatus 1000 shown in FIG. 1. As shown in FIG. 1, digital outputs GPIO(0) to GPIO(N) from a controller (not shown in FIG. 4 for ease of understanding the invention) are applied as input to resistors R(0) to R(N), the output from resistors R(0) to R(N) is applied as input to summing point 120.

As further shown in FIG. 4, an input from a "positive" side of the VCM (i.e., VCM back-EMF VCMP) is applied as input to terminal $110_1$ where it is scaled by a resistor, added to $V_D/2$ at summing point 121, and applied as input to a positive terminal of differential amplifier 135. As further shown in FIG. 4, an input from a "negative" side of the VCM (i.e., VCM back-EMF VCMN) is applied as input to terminal $110_2$ where it is scaled by a resistor, added to $V_{ref}$ (to be described below), and applied as input to a negative terminal of differential amplifier 135. As was described above in conjunction with FIG. 1, $V_{ref}$ is determined by output from resistors R(0) to R(N) after receiving inputs in the form of digital outputs GPIO(0) to GPIO(N).

As further shown in FIG. 4, the output from differential amplifier 135 is applied as input to a positive terminal of comparator 145. Finally, as further shown in FIG. 4, $V_D/2$ is applied as input to a negative terminal of comparator 140

As was described above with respect to FIG. 1, output 150 from comparator 145 is 0 if $V_{back}-V_{ref}+V_D/2<V_D/2$, and output 150 is, for example and without limitation, $V_D$, if $V_{back}-V_{ref}+V_D/2>V_D/2$. Differential amplifier 135 and comparator 145 may be fabricated utilizing any one of a number of suitable components that are well known to those of ordinary skill in the art.

Figure 6:
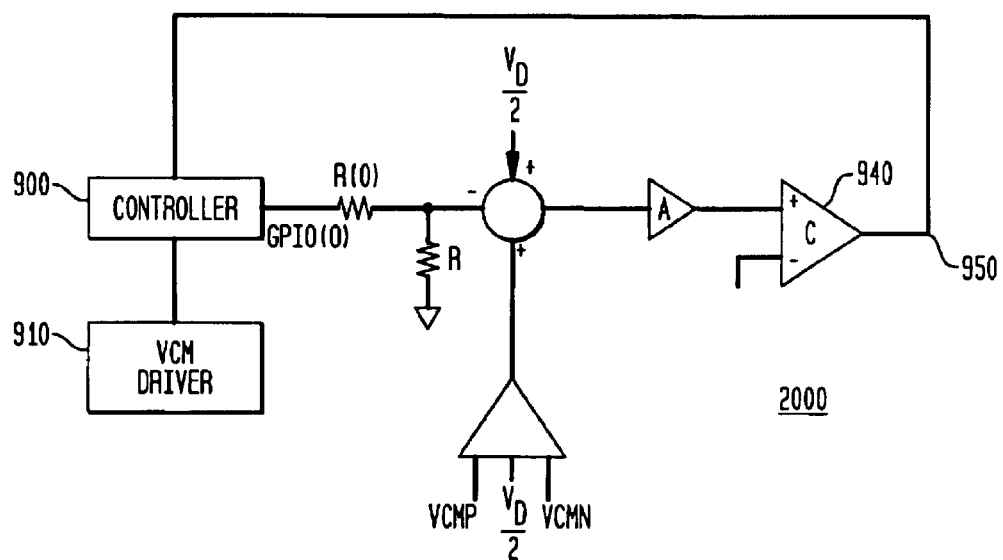
FIG. 6 shows a block diagram of an apparatus that carries out the algorithm shown in FIG. 5, which apparatus is fabricated in accordance with one or more embodiments of the present invention.

FIG. 5 shows a flowchart of an algorithm that is fabricated in accordance with one or more embodiments of the present invention, which algorithm may be executed, for example and without limitation, by controller 900 of apparatus 2000 shown in FIG. 6. This algorithm is a feedback control algorithm that utilizes feedback of measurements of disk drive head velocity to cause the disk drive head velocity to approximate a predetermined value of disk drive head velocity, i.e., a target velocity. As one can readily appreciate from FIG. 6, apparatus 2000 includes apparatus 1000 shown in FIG. 1 and adds VCM current driver 910. For this embodiment, only resistor R(0) shown in FIG. 1 is used.

As shown in FIG. 5, at box 700, controller 900 outputs GPIO(0) to generate a reference voltage level corresponding to a predetermined value of disk drive head velocity, i.e., a target velocity. Control is then transferred to box 710.

At box 710, controller 900 waits for the circuits to settle. Control is then transferred to box 720.

At box 720, controller 900 disables VCM current driver 910. Control is then transferred to box 730.

At box 730, controller 900 waits for circuits to recover from disabling of VCM current driver 910. Control is then transferred to box 740.

At box 740, controller 900 samples Comparator State (for example, digital output state signal 950 from comparator 940 shown in FIG. 6). Control is then transferred to decision box 750.

At decision box 750, controller 900 determines whether Comparator State=0 to determine whether the VCM back-EMF is below the reference voltage level. If so, control is transferred to box 760, otherwise, control is transferred to box 770.

At box 760, controller 900 sets VelocityError=+ Vconstant. In essence, the VCM back-EMF is below the reference voltage level, and more current must be applied to the VCM to accelerate the disk drive head. Control is then transferred to box 780.

At box 770, controller 900 sets VelocityError=− Vconstant. In essence, the VCM back-EMF is above the reference voltage level. Control is then transferred to box 780.

At box 780, controller 900 sets ControlOutput= (VelocityError*PROPORTIONALgain)+Integrator. ControlOutput is an amount of current to apply to the VCM to accelerate or decelerate the disk drive head, as the case may be, so that the velocity of the disk drive head will approach the desired target velocity. Appropriate values of Vconstant and PROPORTIONALgain may be determined by one of ordinary skilled in the art routinely without undue experimentation based on the characteristics of particular drive mechanics and performance required. Control is then transferred to box 790.

At box 790, controller 900 enables VCM current driver 910, and sets the current output equal to ControlOutput. Control is then transferred to box 800.

At box 800, controller 900 sums the total correction by setting, Integrator=Integrator+ (VelocityError*INTEGRATORgain). An appropriate value of INTEGRATORgain may be determined by one of ordinary skilled in the art routinely without undue experimentation based on the mechanical characteristics of a particular disk drive and the performance required. Control is then transferred to box 810.

At box 810, controller 900 waits for a predetermined amount of time for VCM current driver 910 to output current. Control is then transferred to decision box 820.

At decision box 820, controller 900 determines whether termination of the algorithm has been requested. If so, control is transferred to box 830 to exit, otherwise, control is transferred to box 720.

Although various embodiments that incorporate the teachings of the present invention have been shown and described in detail herein, those skilled in the art can readily devise many other varied embodiments that still incorporate these teachings.

What is claimed is:

1. Apparatus to provide a measure of disk drive head velocity in a disk drive wherein movement is produced by a disk drive motion mechanism that includes a coil, which apparatus comprises:

a controller that outputs one or more digital signals that are applied as input to a first component, and in response, the first component outputs a reference voltage;

a second component, responsive to voltage output across the coil and the reference voltage, outputs a measure of a difference between the coil voltage and the reference voltage; and a third component, responsive to the measure of the difference, outputs a first value if the coil voltage is greater than the reference voltage and a second value if the coil voltage is less than the reference voltage, which third component output is applied as input to the controller;

wherein the controller executes a search algorithm that varies the one or more digital signals while observing changes in the third component output to provide a digital estimate of the coil voltage, which estimate provides a measure of the disk drive head velocity.

2. The apparatus of claim 1 wherein the first component comprises one or more resistors.

3. The apparatus of claim 2 wherein the third component is a comparator.

4. The apparatus of claim 2 wherein the second component is a differential amplifier.

5. The apparatus of claim 1 wherein the first component comprises a digital-to-analog converter having one or more inputs, and an output from the DAC is applied as input to a resistor.

6. The apparatus of claim 5 wherein the third component is a comparator.

7. The apparatus of claim 5 wherein the second component is a differential amplifier.

8. Apparatus that causes disk drive head velocity in a disk drive wherein movement is driven by a disk drive motion mechanism that includes a coil to approximate a predetermined value of disk drive head velocity, which apparatus comprises:

a current driver that applies current to the coil in response to a current signal;

a controller that outputs: (a) one or more digital signals that are applied as input to a first component, and response, the first component outputs a reference voltage, and (b) the current signal;

a second component, responsive to voltage output across the coil and the reference voltage, outputs a measure of a difference between the coil voltage and the reference voltage; and a third component, responsive to the measure of the difference, outputs a first value if the coil voltage is greater than the reference voltage and a second value if the coil voltage is less than the reference voltage, which third component output is applied as input to the controller;

wherein the controller executes a feedback algorithm that varies the current signal while observing changes in the third component output, wherein the feedback algorithm causes the current signal to supply more current to the coil whenever the third component is equal to the second value and causes the current signal to supply more current otherwise.

* * * * *